US012626080B2

(12) United States Patent
Sekiya et al.

(10) Patent No.: US 12,626,080 B2
(45) Date of Patent: May 12, 2026

(54) TEST SAMPLE READING DEVICE AND TEST SAMPLE READING METHOD

(71) Applicant: Hitachi High-Tech Corporation, Tokyo (JP)

(72) Inventors: Kento Sekiya, Tokyo (JP); Jiro Hashizume, Tokyo (JP); Taiki Fuji, Tokyo (JP); Jaesung Yang, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 18/837,781

(22) PCT Filed: Dec. 21, 2022

(86) PCT No.: PCT/JP2022/047064
§ 371 (c)(1),
(2) Date: Aug. 13, 2024

(87) PCT Pub. No.: WO2023/188610
PCT Pub. Date: Oct. 5, 2023

(65) Prior Publication Data
US 2025/0148239 A1 May 8, 2025

(30) Foreign Application Priority Data
Mar. 29, 2022 (JP) ................................. 2022-053780

(51) Int. Cl.
 *G06K 7/14* (2006.01)
(52) U.S. Cl.
 CPC ................................. *G06K 7/1413* (2013.01)
(58) Field of Classification Search
 CPC ...... G06K 7/1413; G06K 7/1417; G06K 7/14; G06K 7/10732
(Continued)

(56) References Cited

U.S. PATENT DOCUMENTS

2005/0247790 A1* 11/2005 Itoh .................. G01N 35/00732
235/462.01
2009/0121027 A1 5/2009 Nadabar
(Continued)

FOREIGN PATENT DOCUMENTS

DE 102013210287 A1 * 12/2014 ......... G06K 7/10782
EP 2 164 028 A1 3/2010
(Continued)

OTHER PUBLICATIONS

International Search Report (PCT/ISA/210) issued in PCT Application No. PCT/JP2022/047064 dated Mar. 20, 2023 with English translation (7 pages).
(Continued)

*Primary Examiner* — Edwyn Labaze
(74) *Attorney, Agent, or Firm* — Crowell & Moring LLP

(57) ABSTRACT

Self-luminous barcode readers 102A, 102B, 102C, 102D, 102E, 102F are provided in an arrangement such that irradiating light emitted from the barcode readers 102A, 102B, 102C, 102D, 102E, 102F entirely covers a surface provided with a barcode 107 and optical axes 104A, 104B, 104C, 104D, 104E, 104F of the irradiating light are inclined horizontally at an angle greater than 0° in absolute value and vertically at an angle greater than 0° in absolute value from normal vectors 105A, 105B, 105C of a test surface of a test sample 101 provided with the barcode 107. This arrangement provides a test sample reading device and a test sample reading method with which the success rate of barcode reading can be raised compared to the past.

10 Claims, 9 Drawing Sheets

(58) Field of Classification Search

USPC .................................... 235/462.01, 375, 454

See application file for complete search history.

(56)                      References Cited

U.S. PATENT DOCUMENTS

| | | | | |
|---|---|---|---|---|
| 2013/0047711 A1* | 2/2013 | Shibata | ............ | G01N 35/00732 |
| | | | | 73/64.56 |
| 2019/0242919 A1 | 8/2019 | Malyarov et al. | | |
| 2021/0341504 A1 | 11/2021 | Nalam Venkat et al. | | |

FOREIGN PATENT DOCUMENTS

| | | | | |
|---|---|---|---|---|
| JP | 52-133719 | A | | 11/1977 |
| JP | 56-121182 | A | | 9/1981 |
| JP | 5-23274 | U | | 3/1993 |
| JP | 8-22505 | A | | 1/1996 |
| JP | H 10-40327 | A | | 2/1998 |
| JP | 2002-150217 | A | | 5/2002 |
| JP | 2005-338938 | A | | 12/2005 |
| JP | 2006-133065 | A | | 5/2006 |
| JP | 2013-134512 | A | | 7/2013 |
| JP | 2019-16130 | A | | 1/2019 |
| JP | 2019016130 | A | * | 1/2019 |
| JP | 2019-525169 | A | | 9/2019 |
| JP | 2022-501596 | A | | 1/2022 |
| WO | WO 2020/003359 | A1 | | 1/2020 |

OTHER PUBLICATIONS

Japanese-language Written Opinion (PCT/ISA/237) issued in PCT Application No. PCT/JP2022/047064 dated Mar. 20, 2023 with English translation (7 pages).

European Extended Search Report issued in European Application No. 22935737.1 dated Jan. 9, 2026 (13 pages).

* cited by examiner

[FIG. 1]
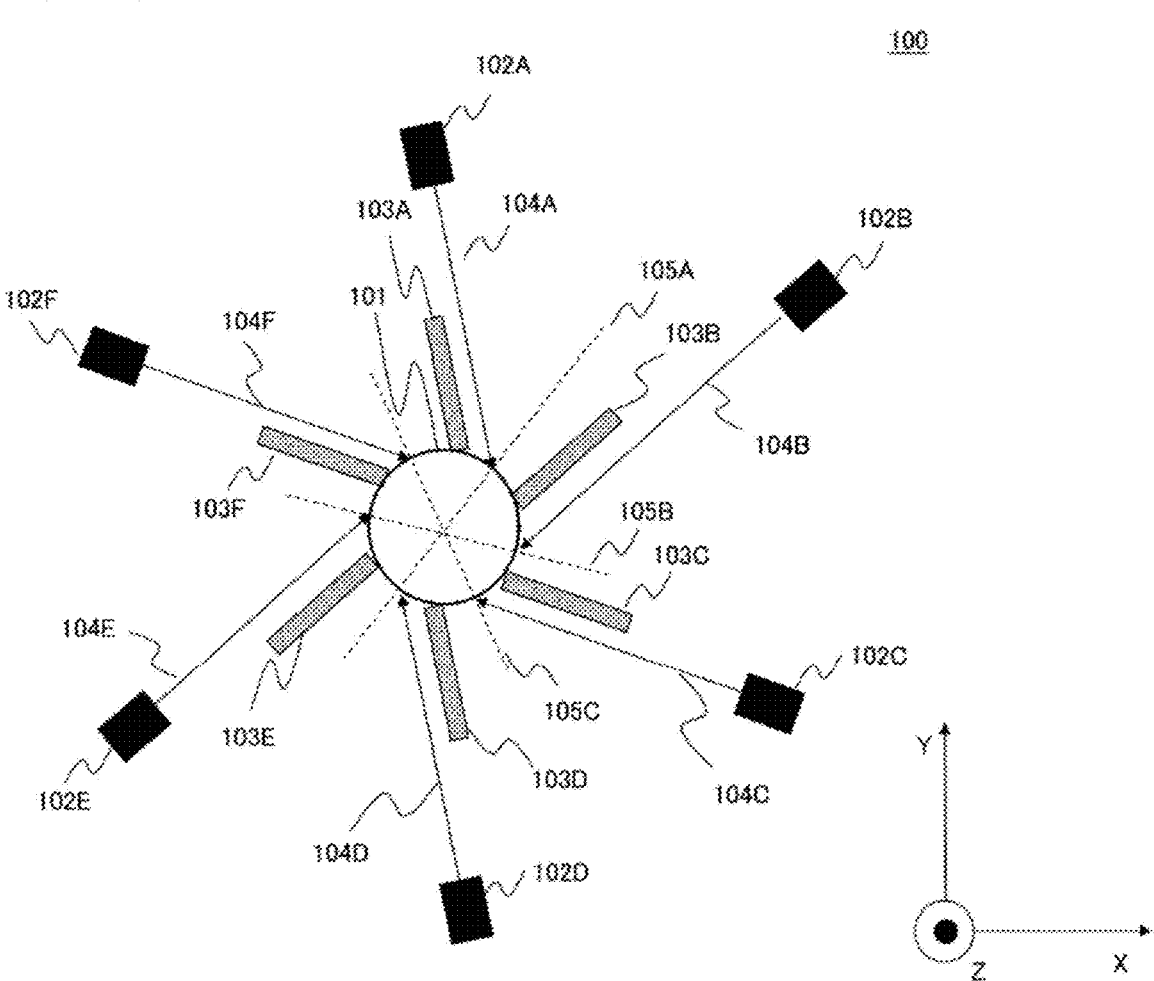

[FIG. 2]
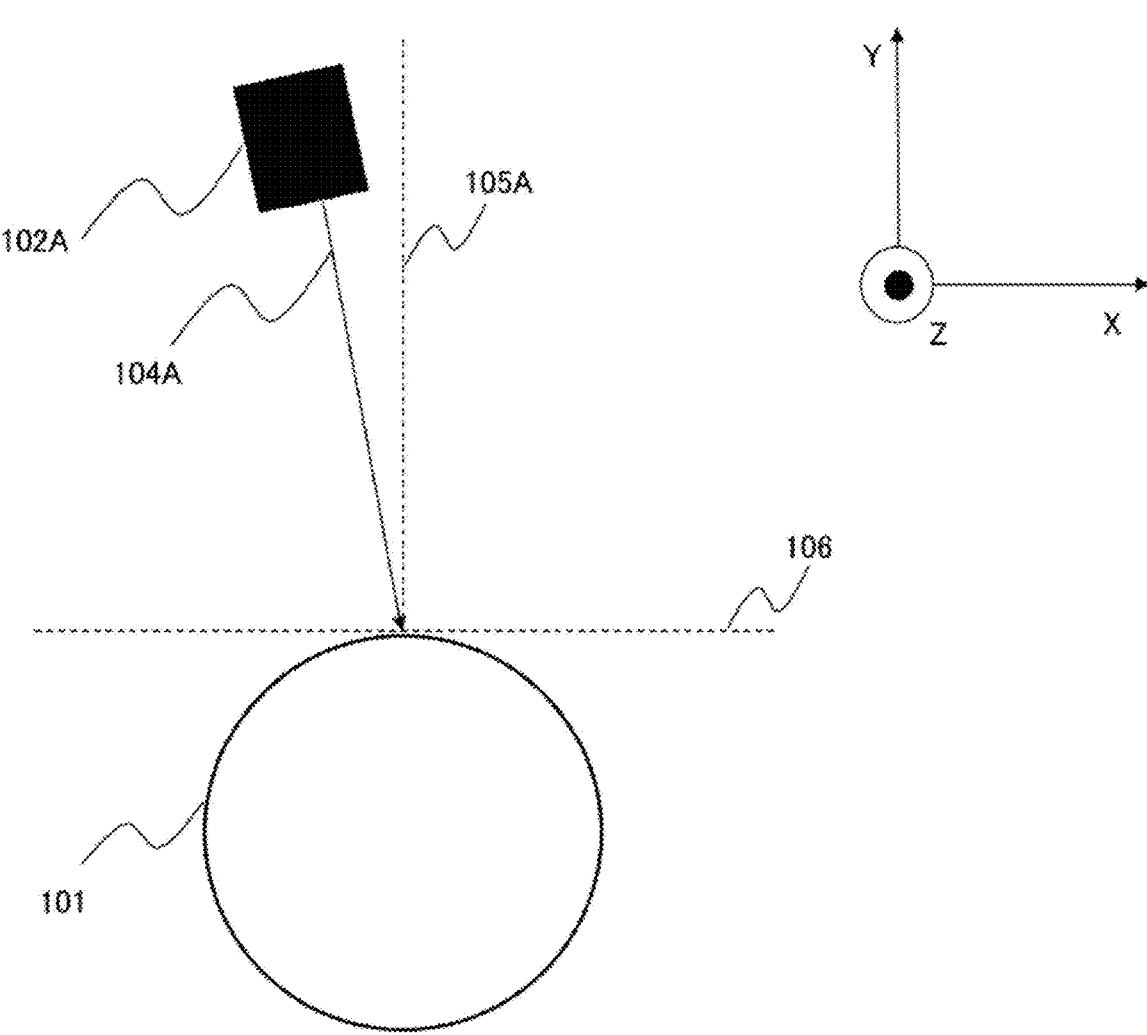

[FIG. 3]
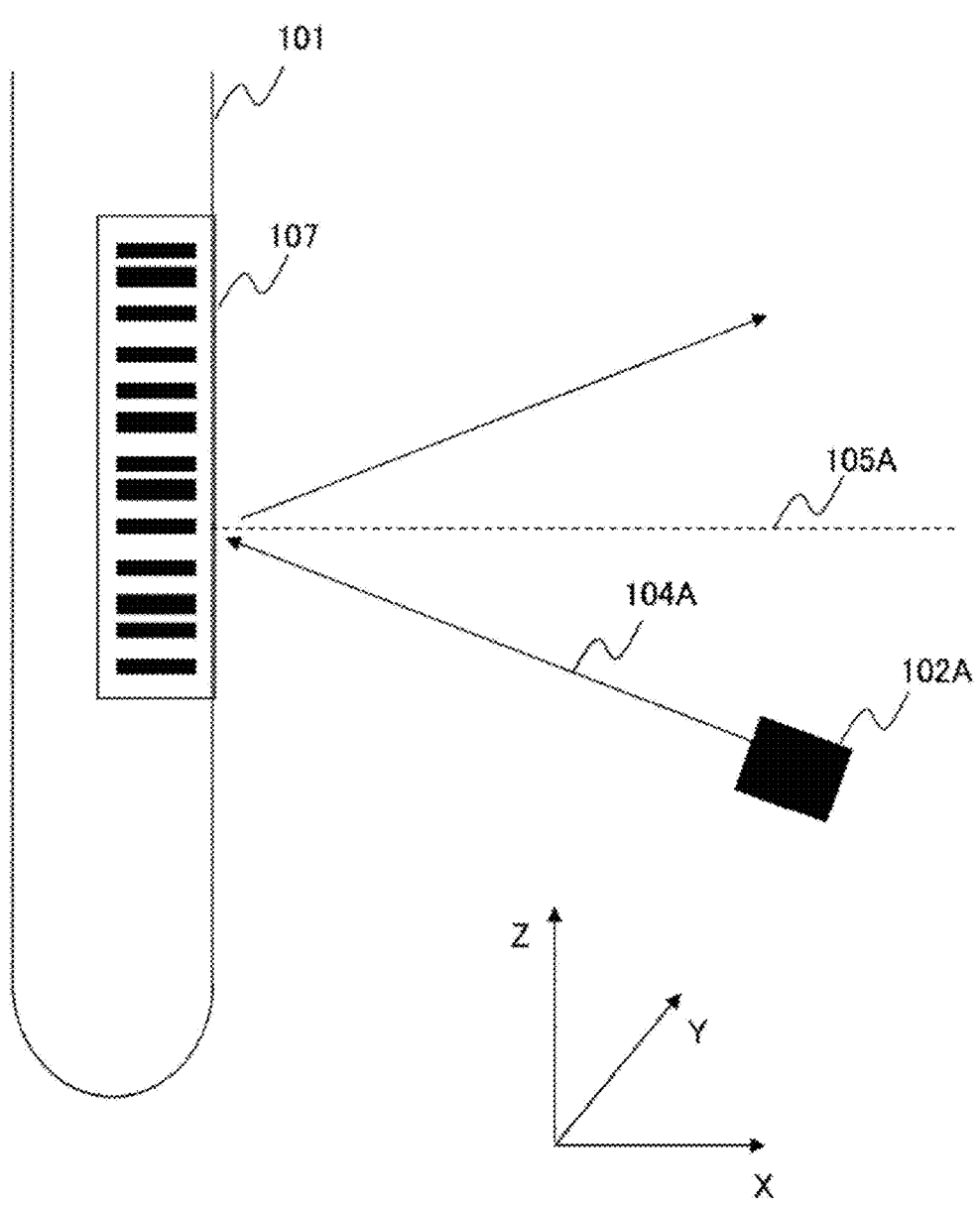

[FIG. 4]
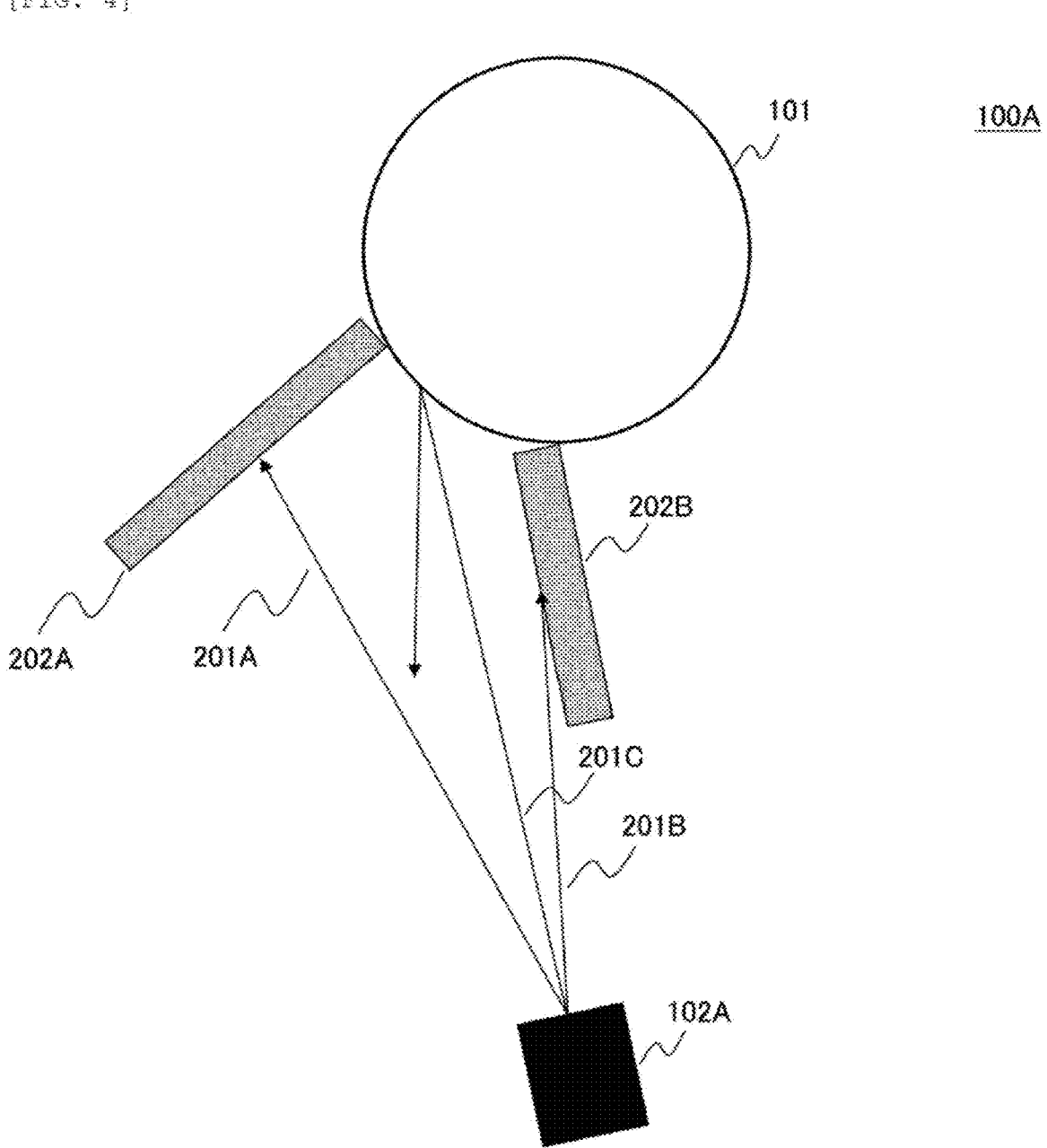

[FIG. 5]
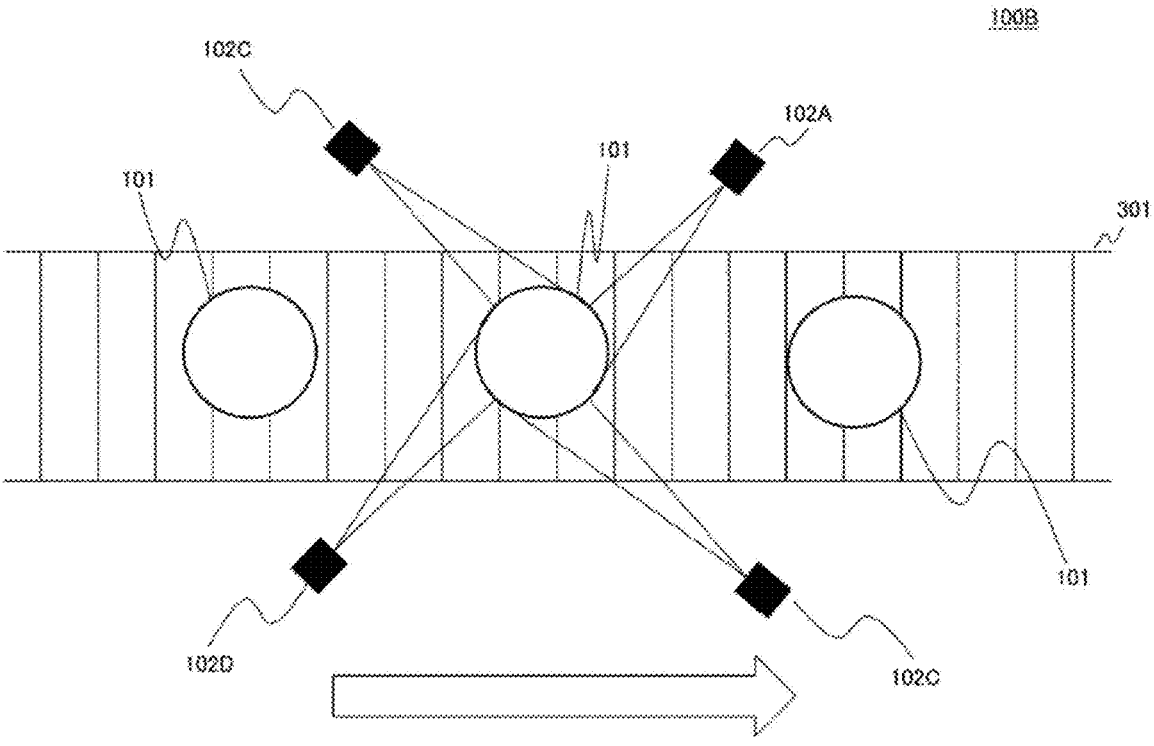
[FIG. 6]
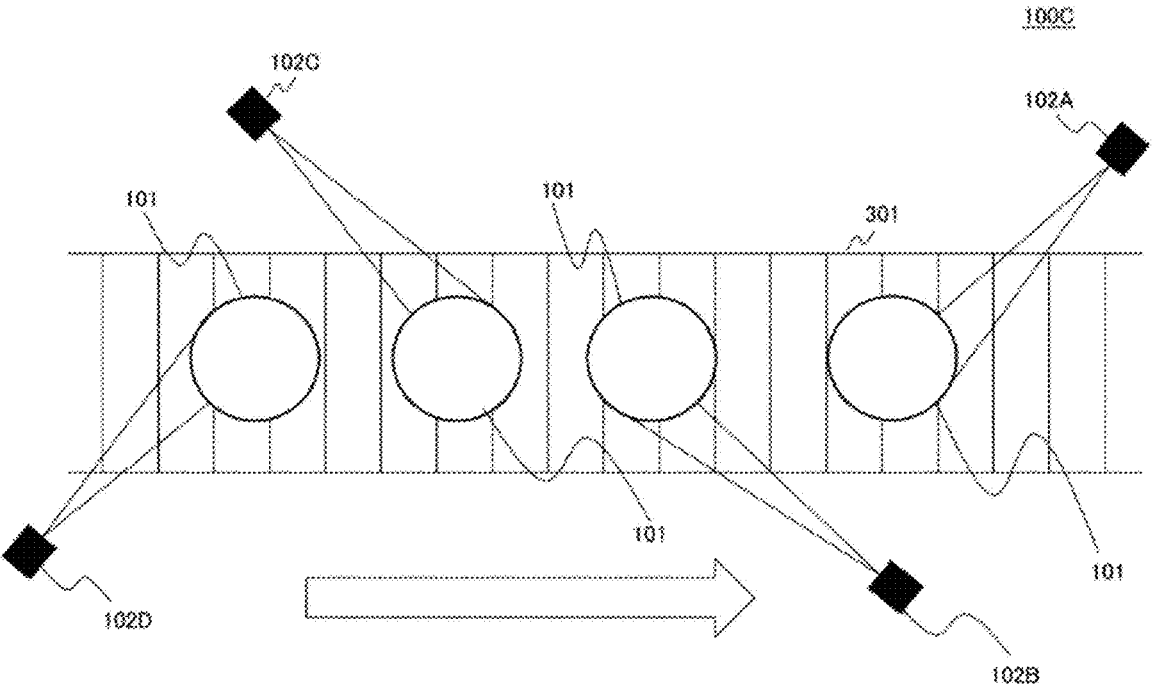

[FIG. 7]
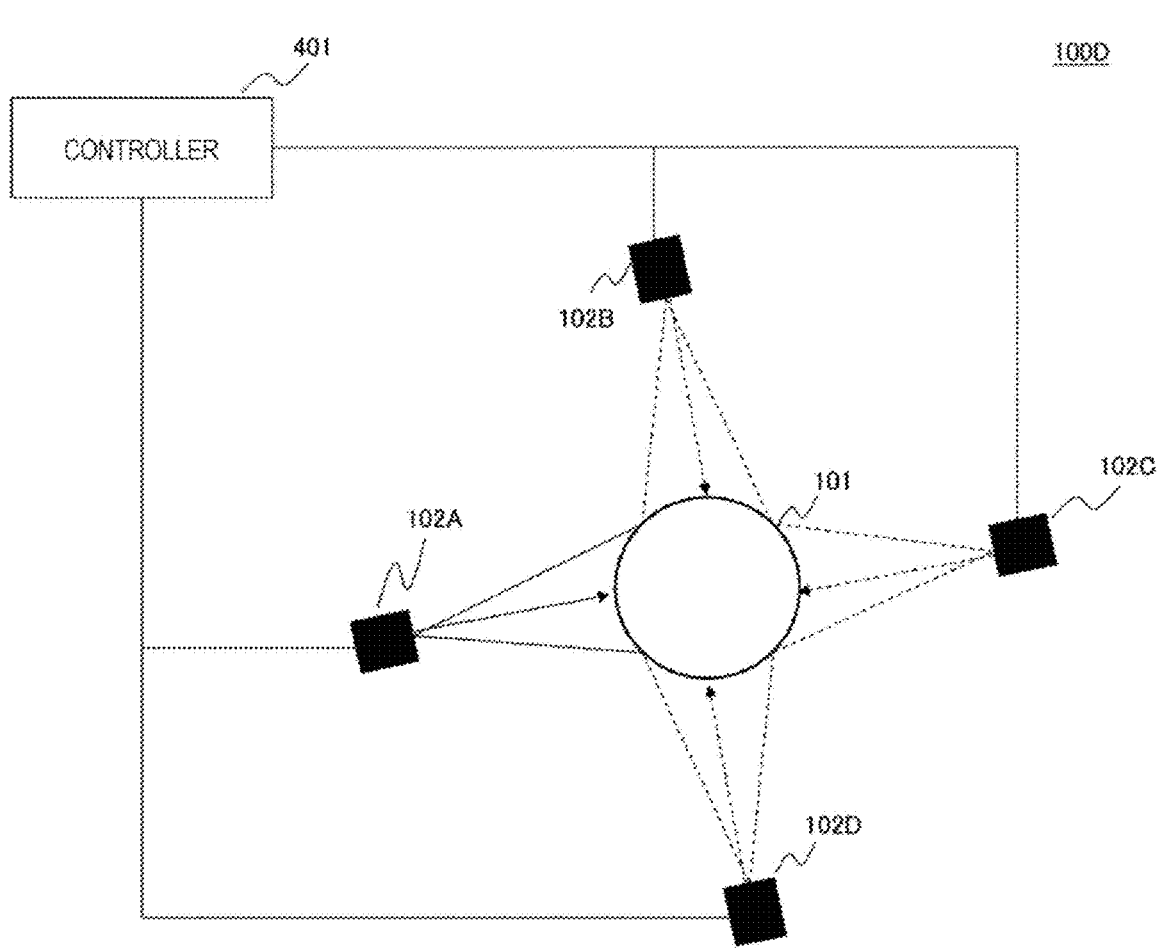

[FIG. 8]
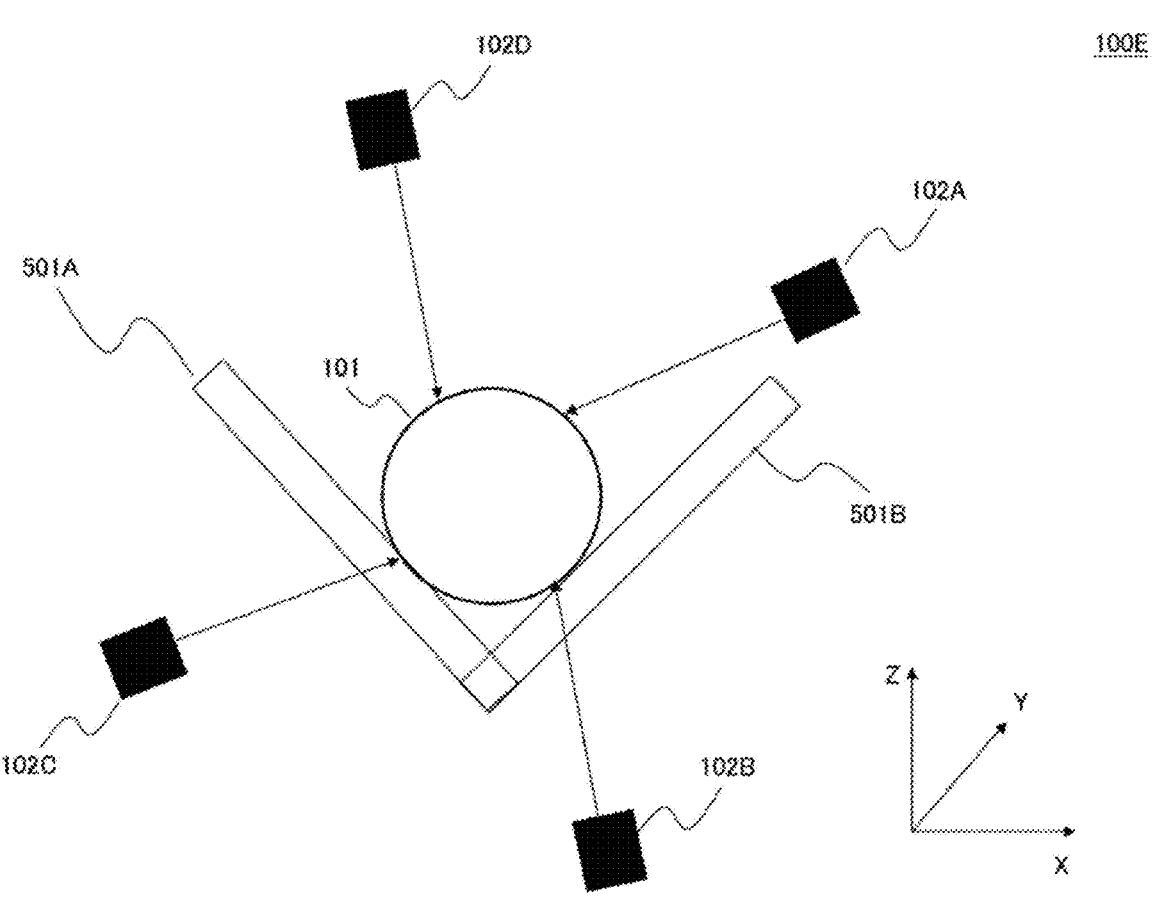

[FIG. 9]
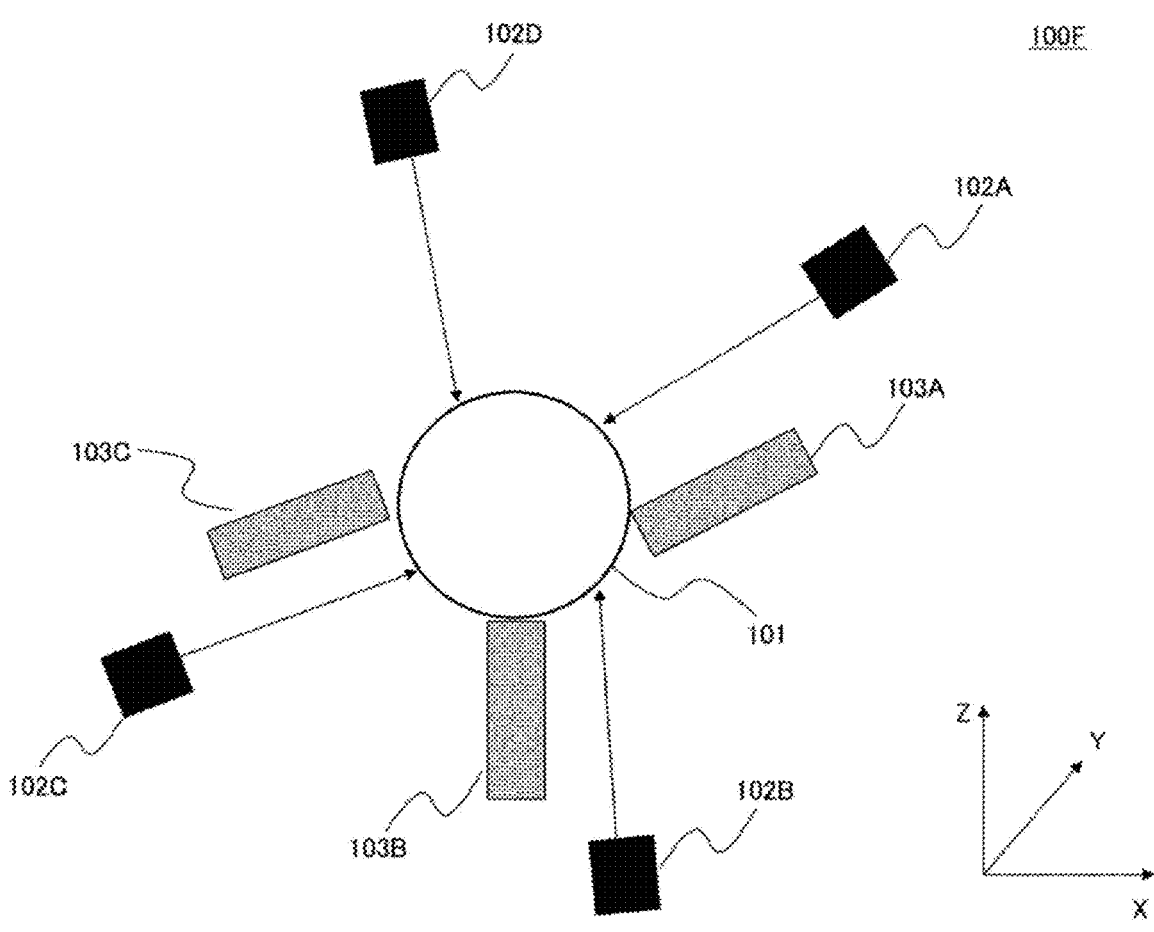

[FIG. 10]
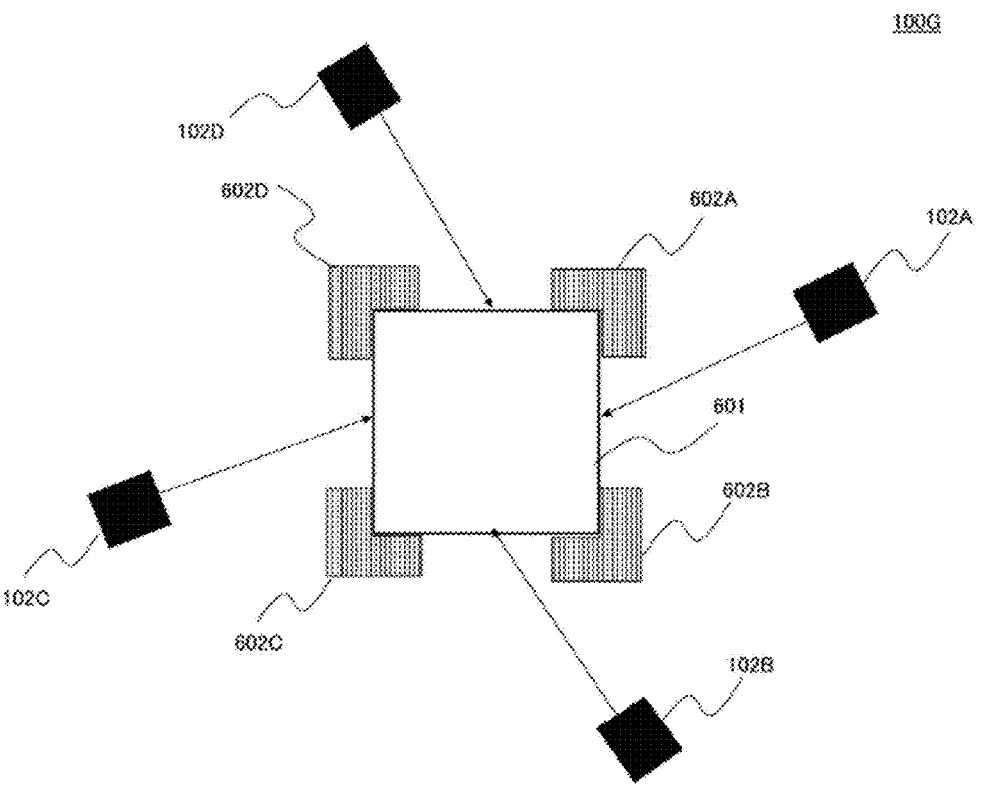
[FIG. 11]
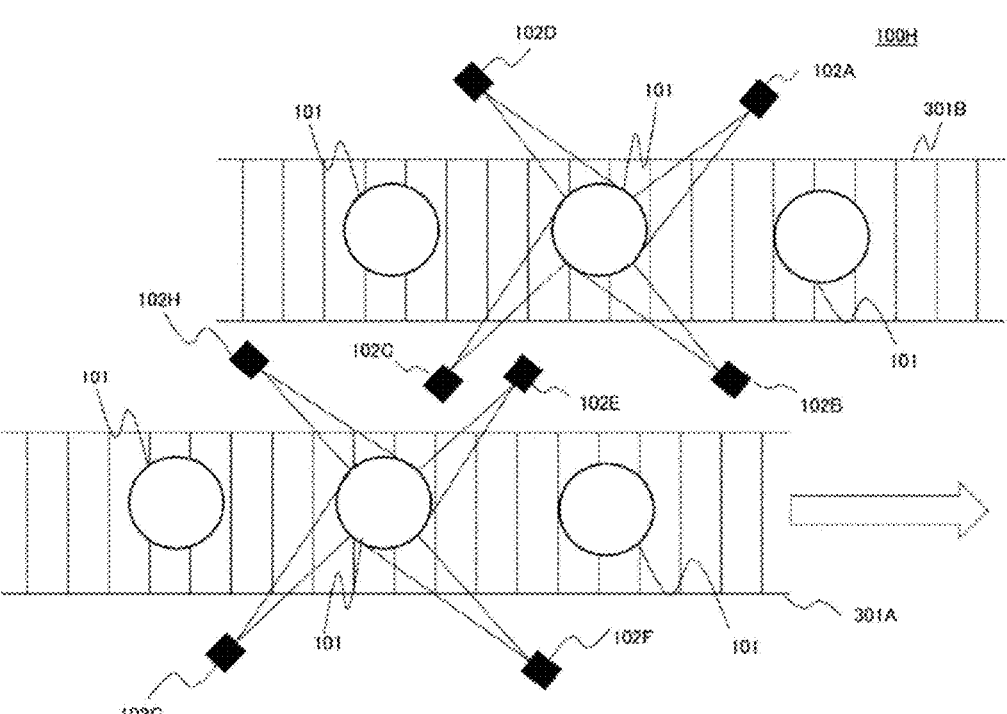

TEST SAMPLE READING DEVICE AND TEST SAMPLE READING METHOD

TECHNICAL FIELD

The present invention relates to a test sample reading device and a test sample reading method for reading a barcode affixed to a test sample.

BACKGROUND ART

PTL 1 describes that "a conveyance device, which is configured to hold and convey a container having a barcode label in an automated system in an in vitro diagnostics environment where a plurality of peripheral readers can read the barcode label", "can consistently capture the container by the double spring arrangement when the container is mounted on the conveyance device and held within the conveyance device during the conveyance operation. Due to the centrally arranged spring housing, an efficient use of space is possible. A mirror image double slot design is provided and the unobstructed space for each slot is complimented, so that a completely unobstructed field of view of the container can be constructed by imaging the same container (sequentially) in both slots and merging the resulting data".

Further, PTL 2 describes that, as a technique that makes it possible to read a symbol affixed to the circumferential surface of an article without changing the direction of the article on a conveyance line, a plurality of symbol readers for irradiating a container to which a barcode is affixed with laser beams from respectively different directions are included, and by combining respective readable ranges of the respective symbol readers to the container, the entire periphery of a side surface of the container is turned to the readable range, and the barcode is read.

CITATION LIST

Patent Literature

PTL 1: JP2019-525169A
PTL 2: JP2013-134512A

SUMMARY OF INVENTION

Technical Problem

A barcode reader is known as a device that reads the barcode affixed to the test sample.

The test sample is often rod-shaped, such as a test tube, and the barcode is usually affixed along the longitudinal direction of the test sample, but an affixation position of the barcode is not always constant.

Therefore, there are a plurality of techniques that automatically read the test sample whose affixation position of the barcode is not constant on a conveyance line.

As an example thereof, the technique described in PTL 1 is known as a technique for holding the container on the conveyance line without blocking a barcode surface. Furthermore, a technique described in PTL 2 is known as a technique for reading the entire circumference of an article by a plurality of barcode readers.

A conventional barcode reading system is configured to irradiate the barcode with light from the front, and has a problem in that strong regular reflection light returns to the light receiving part to thereby reduce the success rate of reading.

When reading the barcode affixed to the test sample on the conveyance line, since a barcode surface is a curved surface, an attempt is made to move the test sample to avoid a regular reflection area of the barcode reader, but this has not reached an essential problem solution.

Furthermore, when reading the barcode on a stationary test sample or when the barcode surface is not the curved surface, there is a problem that regularly reflected light cannot be avoided with a configuration in which it is irradiated with light from the front.

The present invention provides a test sample reading device and a test sample reading method that can increase the success rate of barcode reading compared with conventional ones.

Solution to Problem

The present invention includes a plurality of means for solving the problems described above, and one example thereof is a test sample reading device that reads a barcode provided on a test sample, the test sample reading device including self-luminous barcode readers, in which the self-luminous barcode readers are arranged so that irradiating light emitted from the barcode readers entirely covers a surface provided with the barcode, and optical axes of the irradiating light are inclined in a horizontal direction at an angle greater than 0° in absolute value and in a vertical direction at an angle greater than 0° in absolute value with respect to normal vectors of a test surface of the test sample provided with the barcode.

Advantageous Effects of Invention

According to the present invention, the success rate of barcode reading can be increased compared to the conventional one. Problems, configurations, and effects other than those described above will be made clear by the description of the following examples.

BRIEF DESCRIPTION OF DRAWINGS

FIG. 1 is a diagram illustrating an example of a configuration of a test sample reading device according to Example 1.

FIG. 2 is a diagram illustrating an example of a configuration of an arrangement of a barcode reader according to Example 1.

FIG. 3 is a diagram illustrating an example of the configuration of the arrangement of the barcode reader according to Example 1.

FIG. 4 is a diagram illustrating an example of a configuration of a test sample reading device according to Example 2.

FIG. 5 is a diagram illustrating an example of a configuration of a test sample reading device according to Example 3.

FIG. 6 is a diagram illustrating another example of the configuration of the test sample reading device according to Example 3.

FIG. 7 is a diagram illustrating an example of a configuration of a test sample reading device according to Example 4.

FIG. 8 is a diagram illustrating an example of a configuration of a test sample reading device according to Example 5.

FIG. 9 is a diagram illustrating another example of the configuration of the test sample reading device according to Example 5.

FIG. 10 is a diagram illustrating an example of a configuration of a test sample reading device according to Example 6.

FIG. 11 is a diagram illustrating an example of a configuration of a test sample reading device according to Example 7.

DESCRIPTION OF EMBODIMENTS

Examples of the test sample reading device and the test sample reading method of the present invention will be described below with reference to the drawings. However, the present invention should not be construed as being limited to the contents described in Examples shown below. Those skilled in the art will readily understand that a specific configuration of the present invention can be changed within a range not departing from the idea or spirit thereof.

In the configuration of the invention described below, the same or similar configurations or functions are denoted by the same reference numerals, and redundant descriptions thereof will be omitted.

The notations such as "first", "second", "third" and the like in this specification are attached to identify constituent elements, and do not necessarily limit the number or order thereof.

A position, size, shape, range, and the like of each configuration shown in the drawings, and the like may not represent an actual position, size, shape, range, and the like in order to facilitate understanding of the invention. Therefore, in the present invention, those are not limited to the position, size, shape, range, and the like disclosed in the drawings and the like.

Example 1

Example 1 of the test sample reading device and the test sample reading method of the present invention will be described using FIGS. 1 to 3. FIG. 1 is a diagram illustrating an example of a configuration of the test sample reading device according to Example 1, and FIGS. 2 and 3 are diagrams illustrating an example of a configuration of an arrangement of a barcode reader according to Example 1.

A test sample reading device 100 illustrated in FIG. 1 is a device for reading a barcode 107 provided on a test sample 101 having a circular cross section, and is configured with barcode readers 102A, 102B, 102C, 102D, 102E, and 102F, and test sample holding ribs 103A, 103B, 103C, 103D, 103E, and 103F.

The barcode readers 102A, 102B, 102C, 102D, 102E, and 102F are each a self-luminous type reader, and are arranged at equal intervals around the test sample 101.

More specifically, six barcode readers 102A, 102B, 102C, 102D, 102E, and 102F are arranged at 60° intervals around the test sample 101.

Further, all of optical axes 104A, 104B, 104C, 104D, 104E, and 104F of the barcode readers 102A, 102B, 102C, 102D, 102E, and 102F are deviated from all normal vectors 105A, 105B, and 105C on a test surface (the surface to which the barcode 107 is affixed), and the respective optical axes 104A, 104B, 104C, 104D, 104E, and 104F are deviated from all other optical axes 104A, 104B, 104C, 104D, 104E, and 104F so as not to overlap each other.

Furthermore, irradiating light emitted from the barcode readers 102A, 102B, 102C, 102D, 102E, and 102F can entirely cover a side surface of the test sample 101 on which the barcode 107 is provided, and the barcode 107 can be scanned by any one or more of the barcode readers 102A, 102B, 102C, 102D, 102E, and 102F.

The test sample holding ribs 103A, 103B, 103C, 103D, 103E, and 103F are members that support the side surface of the test sample 101 at least three points (six points in FIG. 1), and are arranged discretely with respect to the side surface of the test sample 101. Further, the test sample holding ribs 103A, 103B, 103C, 103D, 103E, and 103F are arranged between a plurality of barcode readers 102A, 102B, 102C, 102D, 102E, and 102F.

Furthermore, in this example, the test sample holding ribs 103A, 103B, 103C, 103D, 103E, and 103F are each a plate parallel to one of the optical axes 104A, 104B, 104C, 104D, 104E, and 104F, and are arranged so as not to obstruct the respective optical axes 104A, 104B, 104C, 104D, 104E, and 104F.

Therefore, the test sample holding ribs 103A, 103B, 103C, 103D, 103E, and 103F are arranged at equal intervals in a windmill shape with respect to the side surface of the test sample 101.

FIGS. 2 and 3 are diagrams illustrating an example of an arrangement of the barcode readers according to Example 1. FIG. 2 illustrates the test sample reading device 100 viewed from above, and FIG. 3 illustrates the test sample reading device 100 viewed from the side-surface side.

As illustrated in FIG. 2, it is assumed that, regarding the barcode reader 102A, when defining the normal vector 105A perpendicular to a tangent 106 at a point where the test sample 101 and the optical axis 104A intersect, the barcode reader 102A is arranged so that the optical axis 104A of the irradiating light is inclined in a horizontal direction at an angle greater than 0° in absolute value with respect to the normal vector 105A of the test surface on which the barcode 107 of the test sample 101 is provided.

More specifically, the barcode reader 102A is arranged so that an angle between the optical axis 104A and the normal vector 105A is greater than 0° and equal to or less than 20° in the horizontal direction, more preferably 10°, and the barcode reader 102A is arranged so that the optical axis 104A and normal vector 105A on a surface of the barcode 107 are not parallel to each other.

As illustrated in FIG. 3, since the barcode 107 is affixed along the longitudinal direction of the test sample 101, it is assumed that arrangement is performed so that the optical axis 104A of the irradiating light is inclined in a vertical direction at an angle greater than 0° in absolute value with respect to the normal vector 105A of the test surface of the test sample 101 on which the barcode 107 is provided.

More specifically, the barcode reader 102A is arranged so that the angle between the optical axis 104A and the normal vector 105A is greater than 0° and equal to or less than 30° in the vertical direction, more preferably 15° in the vertical direction, and, as in the case of the horizontal direction, the barcode reader 102A is arranged so that the normal vector 105A and optical axis 104A on the surface of the barcode 107 are not parallel to each other.

In FIG. 3, the surface of the barcode 107 is irradiated from the lower side in the vertical direction, but the same applies to a configuration in which the surface is irradiated from the upper side. It goes without saying that the angle formed by the optical axis 104A and the normal vector 105A needs to be set within a range of a reading field of view of the barcode reader 102A.

The arrangement relationships in FIGS. 2 and 3 are the same for all other barcode readers 102B, 102C, 102D, 102E, and 102F, and the details thereof will be omitted.

Note that the configuration of the test sample reading device 100 of FIG. 1 is an example, and is not limited thereto.

In FIG. 1, since the six barcode readers 102A, 102B, 102C, 102D, 102E, and 102F are arranged at equal intervals of 60° around the test sample 101, the normal vector 105A perpendicular to the tangent 106 at the point where the test sample 101 and the optical axis 104A of the barcode reader 102A intersect and the normal vector perpendicular to the tangent 106 at the point where the optical axis 104D of the barcode reader 102D intersects with the test sample 101 are common, the normal vector 105B perpendicular to the tangent 106 at the point where the test sample 101 and the optical axis 104B of the barcode reader 102B intersect and the normal vector perpendicular to the tangent 106 at the point where the optical axis 104E of the barcode reader 102E intersects with the test sample 101 are common, and the normal vector 105C perpendicular to the tangent 106 at the point where the test sample 101 and the optical axis 104C of the barcode reader vector 102C intersect and the normal perpendicular to the tangent 106 at the point where the optical axis 104F of the barcode reader 102F intersects with the test sample 101 are common, but they are not limited to such arrangement and can be changed appropriately.

For example, the number of barcode readers is determined by a sensing range of the barcode readers. What is important is to determine the number of barcode readers so that the sum of sensing ranges of the plurality of barcode readers is larger than the entire circumference 360° of the test sample 101 so that the test sample 101 does not need to be rotated.

When the cross section of a test tube like the test sample 101 of FIG. 1 is circular, since the barcode surface is a curved surface, there is a concern that the barcode surface is distorted when viewed from the barcode reader near the boundary between adjacent irradiating lights, which results in a decrease in reading accuracy. Therefore, it is desirable to arrange more barcode readers than the minimum number required and partially overlap the sensing ranges to achieve stable reading.

Further, although it is desirable to arrange the same number of test sample holding ribs as the number of barcode readers, there is no particular limitation, and the number of test sample holding ribs can be one or more.

A user installs the test sample 101 so as to be fit within the test sample holding ribs 103A, 103B, 103C, 103D, 103E, and 103F, and causes the barcode readers 102A, 102B, 102C, 102D, 102E, and 102F to emit light. After reading is completed by any of the barcode readers 102A, 102B, 102C, 102D, 102E, and 102F, the test sample 101 is grabbed up and taken, and the next test sample 101 is installed. By repeating this, information on the required number of test samples 101 is read.

Next, the effects of this example will be described.

The test sample reading device 100 that reads the barcode 107 provided on the test sample 101 according to Example 1 of the present invention described above includes self-luminous barcode readers 102A, 102B, 102C, 102D, 102E, and 102F, and the self-luminous barcode readers 102A, 102B, 102C, 102D, 102E, and 102F are arranged so that irradiating light emitted from the barcode readers 102A, 102B, 102C, 102D, 102E, and 102F entirely covers a surface provided with the barcode 107 and the optical axes 104A, 104B, 104C, 104D, 104E, and 104F of the irradiating light are inclined in the horizontal direction at an angle greater than 0° in absolute value and in the vertical direction at an angle greater than 0° in absolute value with respect to the normal vectors 105A, 105B, and 105C of the test surface of the test sample 101 provided with the barcode 107.

With this, since it is possible to avoid regularly reflected light from returning to light receiving parts of the barcode readers 102A, 102B, 102C, 102D, 102E, and 102F and increase a success rate of reading the barcode 107, it is possible to achieve more stable barcode reading compared with a conventional one.

Further, an irradiation area that is obtained by combining two or more barcode readers 102A, 102B, 102C, 102D, 102E, and 102F entirely covers the surface, two or more optical axes 104A, 104B, 104C, 104D, 104E, and 104F are deviated from all the normal vectors 105A, 105B, and 105C on the test surface, and the respective optical axes 104A, 104B, 104C, 104D, 104E, and 104F are deviated from all other optical axes 104A, 104B, 104C, 104D, 104E, and 104F, and thus the barcode 107 can be detected more reliably and failures in reading due to light emission from other barcode readers 102A, 102B, 102C, 102D, 102E, and 102F can be avoided.

Furthermore, the test sample 101 has a circular cross section, and further includes the test sample holding ribs 103A, 103B, 103C, 103D, 103E, and 103F that support the side surface of the test sample 101 at least three points, the test sample holding ribs 103A, 103B, 103C, 103D, 103E, and 103F are plates parallel to one of the optical axes 104A, 104B, 104C, 104D, 104E, and 104F, and are arranged discretely on the side surface of the test sample 101, so that it is possible to suppress the test sample 101 from wobbling when reading the barcode 107, and to further reduce failures during reading. Further, it is possible to prevent the irradiating light from being blocked by the test sample holding ribs 103A, 103B, 103C, 103D, 103E, and 103F, and it is also possible to reliably avoid a decrease in reading efficiency.

Further, the barcode readers 102A, 102B, 102C, 102D, 102E, and 102F are arranged at equal intervals around the test sample 101 and are arranged so that the angle between the optical axes 104A, 104B, 104C, 104D, 104E, and 104F and the normal vectors 105A, 105B, and 105C is greater than 0° and equal to or less than 20° in the horizontal direction, and greater than 0° and equal to or less than 30° in the vertical direction, and the test sample holding ribs 103A, 103B, 103C, 103D, 103E, and 103F are arranged between the plurality of barcode readers 102A, 102B, 102C, 102D, 102E, and 102F, thereby capable of obtaining the arrangement relationship that allows reflected light reflected by the barcode 107 to more efficiently return to the barcode readers 102A, 102B, 102C, 102D, 102E, and 102F and capable of reading the barcode 107 with even higher accuracy.

Example 2

A test sample reading device and a test sample reading method according to Example 2 of the present invention will be described using FIG. 4. FIG. 4 is a diagram illustrating an example of a configuration of the test sample reading device according to Example 2.

A test sample reading device 100A according to Example 2 illustrated in FIG. 4 has a configuration in which reflection of irradiating light is prevented by test sample holding ribs 202A and 202B.

The test sample holding ribs 202A and 202B illustrated in FIG. 4 are made of a material or colored member that absorbs irradiating light, and are configured to prevent reflection of irradiating light 201A and 201B. With this, among irradiating light 201A, 201B, and 201C emitted from the barcode reader 102A, the unnecessary irradiating lights 201A and 201B with which portions other than the barcode 107 portion are irradiated are absorbed so that only the diffusely reflected light of the irradiating light 201C directly directed to the test sample 101 is returned to the light receiving part of the barcode reader 102A.

Examples of the test sample holding ribs 202A and 202B are preferably made of non-metallic material and black in color.

Here, the test sample holding ribs 202A and 202B have two roles including a role of maintaining the posture of the test sample 101 vertically and a role of preventing the irradiating lights from the plurality of barcode readers 102A, 102B, 102C, 102D, 102E, and 102F from intersecting each other.

Therefore, it is desirable that the test sample holding ribs 202A and 202B are thin plates so as not to cover the surface of the barcode 107. For example, the above conditions can be satisfied by discretely arranging thin plates of about 50 mm in length, 20 mm in width, and 2 mm in thickness around the test sample.

The other configurations and operations are substantially the same as those of the test sample reading device and the test sample reading method according to Example 1 described above, and the details thereof will be omitted.

Also, in the test sample reading device and the test sample reading method according to Example 2 of the present invention, substantially the same effects as those of the test sample reading device and test sample reading method according to Example 1 described above can be obtained.

Further, the test sample holding ribs 202A and 202B are configured to absorb irradiating light, so that unnecessary irradiating light 201A and 201B are cut and only the diffusely reflected light of the irradiating light 201C directly directed to the test sample 101 returns to the light receiving part of the barcode reader 102A. Therefore, the success rate of reading the barcode 107 can be further increased.

Example 3

A test sample reading device and a test sample reading method according to Example 3 of the present invention will be described using FIGS. 5 and 6. FIGS. 5 and 6 are diagrams illustrating an example of the configuration of the test sample reading device according to Example 3.

A test sample reading device 100B of Example 3 of this example illustrated in FIG. 5 is configured to read the entire circumference of the test sample 101 on a belt conveyor 301 by four barcode readers 102A, 102B, 102C, and 102D.

More specifically, as illustrated in FIG. 5, it is configured such that a portion of the belt conveyor 301 that conveys the test sample 101 is provided with an area where the barcode readers 102A, 102B, 102C, and 102D scan the test sample 101 in all directions, and the barcode readers 102A, 102B, 102C, and 102D read information on the test sample 101 located in the area.

On the belt conveyor 301, the test samples 101 are sequentially conveyed in one direction on the belt conveyor 301.

To describe an example of reading the barcode of the test sample 101, the barcode readers 102A, 102B, 102C, and 102D are arranged around the test sample 101 so as to avoid regular reflection. These barcode readers 102A, 102B, 102C, 102D always emit light, the test sample passes through the area where the barcode readers 102A, 102B, 102C, and 102D scan the test sample 101 in all directions while the plurality of test samples 101 are sequentially conveyed on the belt conveyor 301, and reading of the barcode 107 is completed by any one or more of the barcode readers 102A, 102B, 102C, and 102D, and thus, there is no need to stop the belt conveyor 301 during reading, and it is possible to improve conveyance throughput.

Further, it is possible to adopt a configuration in which, as in a test sample reading device 100C illustrated in FIG. 6, four barcode readers 102A, 102B, 102C, and 102D are arranged to be deviated so that reading timings of the four barcode readers 102A, 102B, 102C, and 102D are shifted and the irradiating lights do not overlap, and the test sample 101 is sequentially scanned in portions of all directions while the test sample 101 is being conveyed.

In a conveyance line to which the test sample reading device 100C is applied, the test sample 101 is sequentially conveyed in one direction by the belt conveyor 301, and a quarter area of the entire circumference of the test sample is read in order from the barcode reader 102D to the barcode reader 102A.

Immediately before entering the reading range of the barcode reader 102D, all the barcode readers 102A, 102B, 102C, and 102D are made to emit light, and the barcode reader 102D first reads a range of 90° out of the entire circumference. If the barcode 107 is read, the test sample 101 is conveyed as it is, the barcode reader 102C is made to emit light if the barcode 107 is not read, the barcode reader 102B is made to emit if the barcode 107 fails to be read, the barcode reader 102A is made to emit light if the barcode 107 further fails to be read, in order, to read the barcode 107. At the time when the reading of the barcode reader 102A is completed, the reading of the entire circumference of 360° of the test sample 101 is completed.

Instead of causing all the barcode readers 102A, 102B, 102C, and 102D to emit light at the same time, a configuration in which only the corresponding barcode readers 102A, 102B, 102C, and 102D are made to emit light when recognizing that the test sample 101 has been conveyed to the reading area by a sensor that detects the test sample 101 and the like can be adopted.

The other configurations and operations are substantially the same as those of the test sample reading device and the test sample reading method according to Example 1 described above, and the details thereof will be omitted.

Also, in the test sample reading device and the test sample reading method according to Example 3 of the present invention, substantially the same effects as those of the test sample reading device and test sample reading method according to Example 1 described above can be obtained.

Further, belt conveyors 301, 301A, and 301B that convey the test sample 101 are provided with the area where the barcode readers 102A, 102B, 102C, and 102D scan the test sample 101 in all directions, and the barcode readers 102A, 102B, 102C, and 102D can read the barcode 107 of the test sample 101 being conveyed by reading information about the test sample 101 located in the area and can improve the efficiency of reading.

Furthermore, by arranging the barcode readers 102A, 102B, 102C, and 102D to be deviated so that the irradiating light does not overlap and sequentially scanning a portion of a reading area of the barcode 107 in all directions while the test sample 101 is being conveyed, it is possible to prevent reading of the reflected light from the barcode 107 from being obstructed by the irradiating light from other barcode readers 102A, 102B, 102C, and 102D, and it is possible to read the barcode 107 more efficiently.

Note that although a form in which the belt conveyor 301 is used as a conveyance device is described, the conveyance device is not limited to this, and can be formed into a form such as electromagnetic conveyance or a self-propelled type in which a holder of a test sample moves by itself.

Example 4

A test sample reading device and a test sample reading method according to Example 4 of the present invention will be described using FIG. 7. FIG. 7 is a diagram illustrating an example of a configuration of the test sample reading device according to Example 4.

A test sample reading device 100D of this example illustrated in FIG. 7 controls the light emission timing of a plurality of barcode readers 102A, 102B, 102C, and 102D. Although a case where four barcode readers 102A, 102B, 102C, and 102D are used is described in FIG. 7, two or more barcode readers can be used.

A controller 401 illustrated in FIG. 7 is connected to the barcode readers 102A, 102B, 102C, and 102D, and controls the light emission timing so as to emit light at different timings. This controller 401 is not particularly limited as long as it is a device capable of communicating with the barcode readers 102A, 102B, 102C, and 102D, such as a PC.

If the controller 401 successfully read the barcode 107, the controller can end a reading operation, and if the controller 401 fails to read the barcode 107, the controller can select one of the barcode readers 102A, 102B, 102C, and 102D that has not yet emitted light and cause the selected barcode reader to emit light.

For example, if the barcode reader 102A emits light first and successfully reads the barcode 107 affixed to the test sample 101, the remaining barcode readers 102B, 102C, and 102D do not emit light.

If reading by the barcode reader 102A fails, one of the barcode readers 102B, 102C, and 102D is selected and caused to emit light. After that, the barcode readers 102A, 102B, 102C, and 102D repeatedly emit light until the barcode 107 is successfully read. Finally, reading of the barcode 107 is completed by any one of the barcode readers 102A, 102B, 102C, and 102D.

Note that if reading by all the barcode readers 102A, 102B, 102C, and 102D fails, it is possible to take measures such as notifying an error or executing sequential reading by the barcode readers 102A, 102B, 102C, and 102D again.

The other configurations and operations are substantially the same as those of the test sample reading device and the test sample reading method according to Example 1 described above, and the details thereof will be omitted.

Also, in the test sample reading device and the test sample reading method according to Example 4 of the present invention, substantially the same effects as those of the test sample reading device and test sample reading method according to Example 1 described above can be obtained.

Further, by further providing the controller 401 that causes the barcode readers 102A, 102B, 102C, and 102D to emit light at different timings, reading control can be automated.

Furthermore, if reading of the barcode 107 is successful, the controller 401 can end the reading operation, and if the reading of the barcode 107 fails, the controller 401 can select one of the barcode readers 102A, 102B, 102C, and 102D that has not yet emitted light and cause the selected barcode reader to emit light, thereby capable of eliminating the influence of the irradiating light from the adjacent barcode readers 102A, 102B, 102C, and 102D during reading, and capable of further increasing the success rate of reading. Further, since the barcode readers 102A, 102B, 102C, and 102D that do not emit light exist in some cases, the effect that wear and tear of the reader can be suppressed can also be obtained.

Example 5

A test sample reading device and a test sample reading method according to Example 5 of the present invention will be described using FIGS. 8 and 9. FIG. 8 and FIG. 9 are diagrams illustrating an example of a configuration of the test sample reading device according to Example 5.

A test sample reading device 100E of this example illustrated in FIG. 8 is in a form in which the posture of the test sample 101 is changed.

As illustrated in FIG. 8, a cylindrical shaft of the cylindrical test sample 101 is fixed at a fixed position by test sample holding jigs 501A and 501B so that the barcode 107 can be read in a state where the test sample 101 is horizontally laid down.

The test sample holding jigs 501A and 501B are made of a material that transmits the irradiating light emitted from the barcode readers 102A, 102B, 102C, and 102D. For example, transparent glass may be used as the material that transmits the irradiating light.

Even in such a case, the barcode readers 102A, 102B, 102C, and 102D are arranged so that each of the optical axes 104A, 104B, 104C, and 104D of irradiating light is not parallel to the normal vector of the side surface of the test sample 101.

Further, the test sample holding ribs such as those used in Example 1 can also be used. As in a test sample reading device 100F illustrated in FIG. 9, this is an example of another configuration in the case where the barcode 107 is read in the state where the test sample 101 is horizontally laid down.

As illustrated in FIG. 9, the test sample holding ribs 103A, 103B, and 103C are discretely arranged on the lower side of the test sample 101 so that the test sample 101 does not fall. The barcode readers 102B and 102C irradiate the test sample 101 from between the test sample holding ribs 103A, 103B, and 103C. The test sample holding ribs 103A, 103B, and 103C are not required on the upper side of the test sample 101, and the upper half of the test sample is irradiated by the barcode readers 102A and 102D.

The other configurations and operations are substantially the same as those of the test sample reading device and the test sample reading method according to Example 1 described above, and the details thereof will be omitted.

Also, in the test sample reading device and the test sample reading method according to Example 5 of the present invention, substantially the same effects as those of the test sample reading device and test sample reading method according to Example 1 described above can be obtained.

Example 6

A test sample reading device and a test sample reading method according to Example 6 of the present invention will be described using FIG. 10. FIG. 10 is a diagram illustrating an example of a configuration of the test sample reading device according to Example 6.

A test sample reading device 100G of this example illustrated in FIG. 10 has a configuration corresponding to a case where a shape of a test sample 601 is different from that of Example 1 and the like.

As illustrated in FIG. 10, assuming that a place to which the barcode 107 of a test sample 601 having a square cross section is attached is one or more of four side surfaces, a test sample reading device 100G is configured with the barcode readers 102A, 102B, 102C, and 102D, and L-shaped test sample holding ribs 602A, 602B, 602C, and 602D.

In this case, four corners of the test sample 601 are fixed by the L-shaped test sample holding ribs 602A, 602B, 602C, and 602D. The L-shaped test sample holding ribs 602A, 602B, 602C, and 602D prevent the test sample 601 from rotating, and prevent the surface of the barcode 107 from being out of an irradiation range of the barcode readers 102A, 102B, 102C, and 102D.

Further, the barcode readers 102A, 102B, 102C, and 102D are arranged so that the irradiation optical axes thereof are not perpendicular to the surface of the barcode 107. For example, when applied to the conveyance line of Example 3, when the surface of the barcode 107 is flat like a square, even if the test sample 601 is moved in parallel, the angle between an irradiation optical axis and the surface of the barcode 107 does not change. Therefore, by deviating the irradiation optical axis from the normal vector of the surface of the barcode 107 in advance, it is possible to avoid a decrease in reading accuracy due to regular reflection.

The other configurations and operations are substantially the same as those of the test sample reading device and the test sample reading method according to Example 1 described above, and the details thereof will be omitted.

Also, in the test sample reading device and the test sample reading method according to Example 6 of the present invention, substantially the same effects as those of the test sample reading device and test sample reading method according to Example 1 described above can be obtained.

Example 7

A test sample reading device and a test sample reading method according to Example 7 of the present invention will be described using FIG. 11. FIG. 11 is a diagram illustrating an example of a configuration of the test sample reading device according to Example 7.

A test sample reading device 100H of this example illustrated in FIG. 11 has a form suitable for reading the test sample 101 conveyed on multi-row belt conveyors 301A and 301B.

FIG. 11 illustrates a configuration in which the barcode 107 is read while the test sample 101 is conveyed on two horizontal rows of the belt conveyors 301 and 301B.

As illustrated in FIG. 11, the belt conveyors 301A and 301B similar to those in Example 3 are arranged adjacent to each other. In that case, regarding the barcode readers 102C and 102E located between the belt conveyors 301A and 301B, by arranging the respective barcode readers so as to irradiate the test sample 101, in addition to arranging the respective barcode readers so that the optical axes of the irradiating light are inclined in a horizontal direction at an angle greater than 0° in absolute value and in a vertical direction at an angle greater than 0° in absolute value with respect to the normal vectors of the test surface of the test sample 101 provided with the barcode 107, it becomes possible to arrange the barcode readers so as not to interfere with each other's irradiation optical axes.

Other barcode readers 102A, 102B, 102D, 102F, 102G, and 102H are arranged so that the optical axes of the irradiating light are inclined in the horizontal direction at an angle greater than 0° in absolute value and in the vertical direction at an angle greater than 0° in absolute value with respect to the normal vector of the test surface of the test sample 101 provided with the barcode 107.

The configuration is not limited to a configuration of two horizontal rows, and a multi-row configuration of three or more rows can be realized by increasing the number of belt conveyors.

The other configurations and operations are substantially the same as those of the test sample reading device and the test sample reading method according to Example 1 described above, and the details thereof will be omitted.

Also, in the test sample reading device and the test sample reading method according to Example 7 of the present invention, substantially the same effects as those of the test sample reading device and the test sample reading method according to Example 1 described above can be obtained.

Others

The present invention is not limited to the examples described above, and includes various modifications. The examples described above have been described in detail to describe the present invention in an easy-to-understand manner, and the present invention is not necessarily limited to those having all the configurations described.

Further, a part of a configuration of a certain example can be replaced with a configuration of another example. Furthermore, the configuration of another example can be added to the configuration of the certain example. Furthermore, other configurations may be added to, deleted from, or replaced with a part of the configuration of each example.

REFERENCE SIGNS LIST

100, 100A, 100B, 100C, 100D, 100E, 100F, 100G, 100H: test sample reading device
101: test sample (circular in cross section)
102A, 102B, 102C, 102D, 102E, 102F, 102G, 102H: barcode reader
103A, 103B, 103C, 103D, 103E, 103F, 202A, 202B: test sample holding rib
104A, 104B, 104C, 104D, 104E, 104F: optical axis
105A, 105B, 105C: normal vector
106: tangent
107: barcode
201A, 201B, 201C: irradiating light
301, 301A, 301B: belt conveyor (conveyance device)
401: controller
501A, 501B: test sample holding jig
601: test sample (square in cross section)
602A, 602B, 602C, 602D: L-shaped test sample holding rib

The invention claimed is:

1. A test sample reading device that reads a barcode provided on a test sample, comprising:
  self-luminous barcode readers, wherein
  the barcode readers are arranged so that
    irradiating light emitted from the barcode readers entirely covers a surface provided with the barcode and
    optical axes of the irradiating light are inclined in a horizontal direction at an angle greater than 0° in absolute value and in a vertical direction at an angle greater than 0° in absolute value with respect to normal vectors of a test surface of the test sample provided with the barcode;

the test sample reading device comprises two or more of the barcode readers, the two or more barcode readers are arranged so that, an irradiation area obtained by combining the two or more of the barcode readers entirely covers the surface, and the two or more optical axes are deviated from all normal vectors of the test surface, and each of the optical axes is deviated from all the others of the optical axes.

2. The test sample reading device according to claim 1, wherein the test sample has a circular cross section, the test sample reading device further comprises ribs that support a side surface of the test sample at at least three points, the ribs are plates parallel to one of the optical axes, and are discretely arranged with respect to the side surface of the test sample.

3. The test sample reading device according to claim 2, wherein the barcode readers are arranged at equal intervals around the test sample, and are arranged so that an angle between the optical axis and the normal vector is greater than 0° and equal to or less than 20° in the horizontal direction, and greater than 0° and equal to or less than 30° in the vertical direction, and the ribs are arranged between the plurality of barcode readers.

4. The test sample reading device according to claim 3, wherein the test sample reading device comprises six of the barcode readers, the six barcode readers are arranged at 60° intervals around the test sample, and arranged so that the angle between the optical axis and the normal vector is 10° in the horizontal direction and 15° in the vertical direction.

5. The test sample reading device according to claim 2, wherein the ribs are configured to absorb the irradiating light.

6. The test sample reading device according to claim 1, wherein a conveyance device that conveys the test sample is provided with an area where the barcode readers scan the test sample in all directions, and the barcode readers read information on the test sample located in the area.

7. The test sample reading device according to claim 6, wherein the area is configured by arranging the barcode readers to be deviated so that the irradiating light does not overlap, and sequentially scan the test sample in portions of all directions during the conveyance of the test sample.

8. The test sample reading device according to claim 1, further comprising:

a controller that causes the barcode readers to emit light at different timings.

9. The test sample reading device according to claim 8, wherein if reading of the barcode is successful, the controller ends a reading operation, and if the reading of the barcode fails, the controller selects one of the barcode readers that have not yet emitted light and causes the barcode reader to emit light.

10. A test sample reading method for reading, by a test sample reading device, a barcode provided on a test sample, wherein the barcode is read by a plurality of self-luminous barcode readers arranged so that irradiating light emitted from the self-luminous barcode readers entirely covers a surface provided with the barcode provided on a test sample and optical axes of the irradiating light are inclined in a horizontal direction at an angle greater than 0° in absolute value and in a vertical direction at an angle greater than 0° in absolute value with respect to normal vectors of a test surface of the test sample provided with the barcode, the test sample reading device comprises two or more of the barcode readers, the two or more barcode readers are arranged so that, an irradiation area obtained by combining the two or more of the barcode readers entirely covers the surface, and the two or more optical axes are deviated from all normal vectors of the test surface, and each of the optical axes is deviated from all the others of the optical axes.

\* \* \* \* \*